Figure 1:
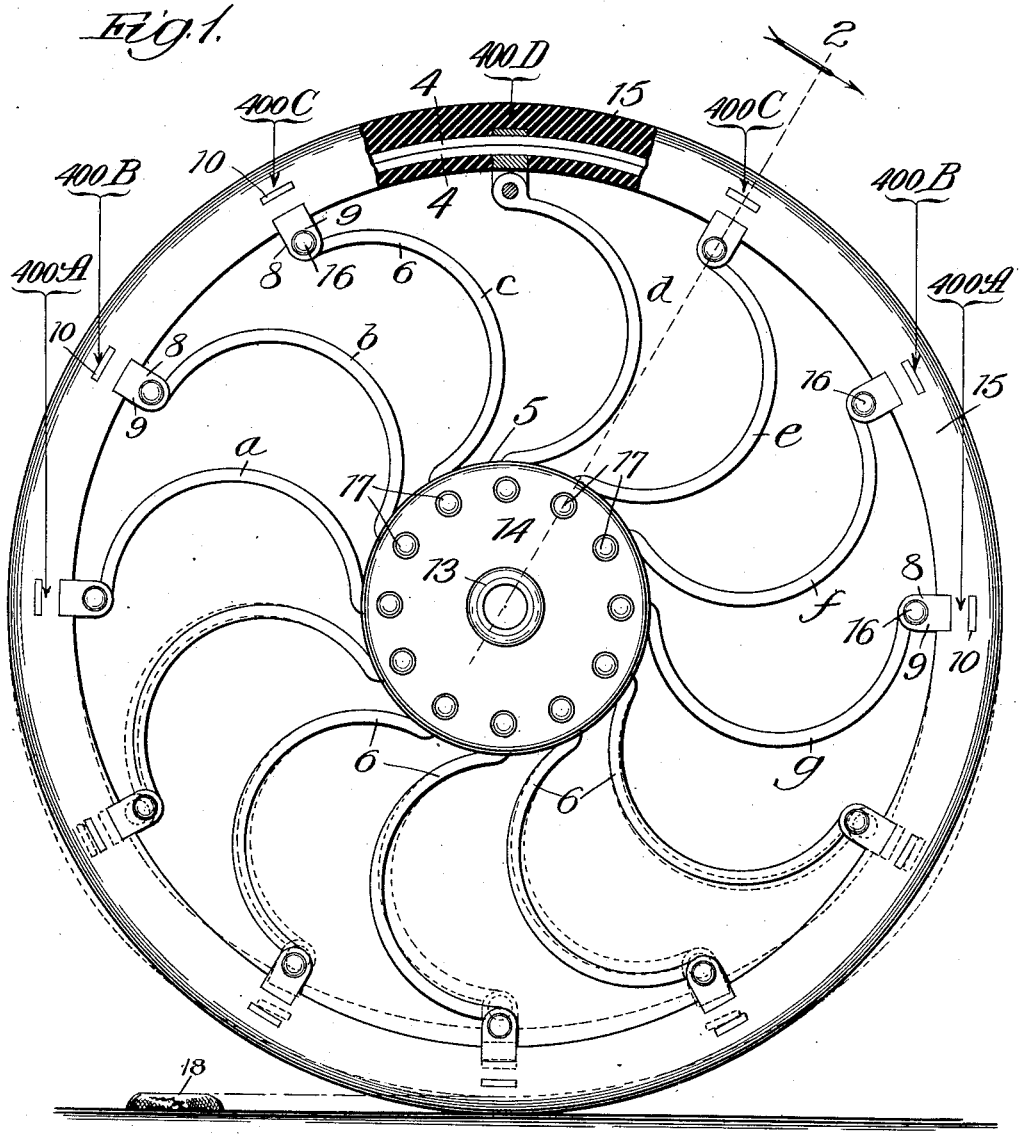

W. H. FAHRNEY.
SPRING VEHICLE WHEEL.
APPLICATION FILED MAY 22, 1913.

1,098,028.

Patented May 26, 1914.
2 SHEETS—SHEET 1.

W. H. FAHRNEY.
SPRING VEHICLE WHEEL.
APPLICATION FILED MAY 22, 1913.
1,098,028.
Patented May 26, 1914.
2 SHEETS—SHEET 2.
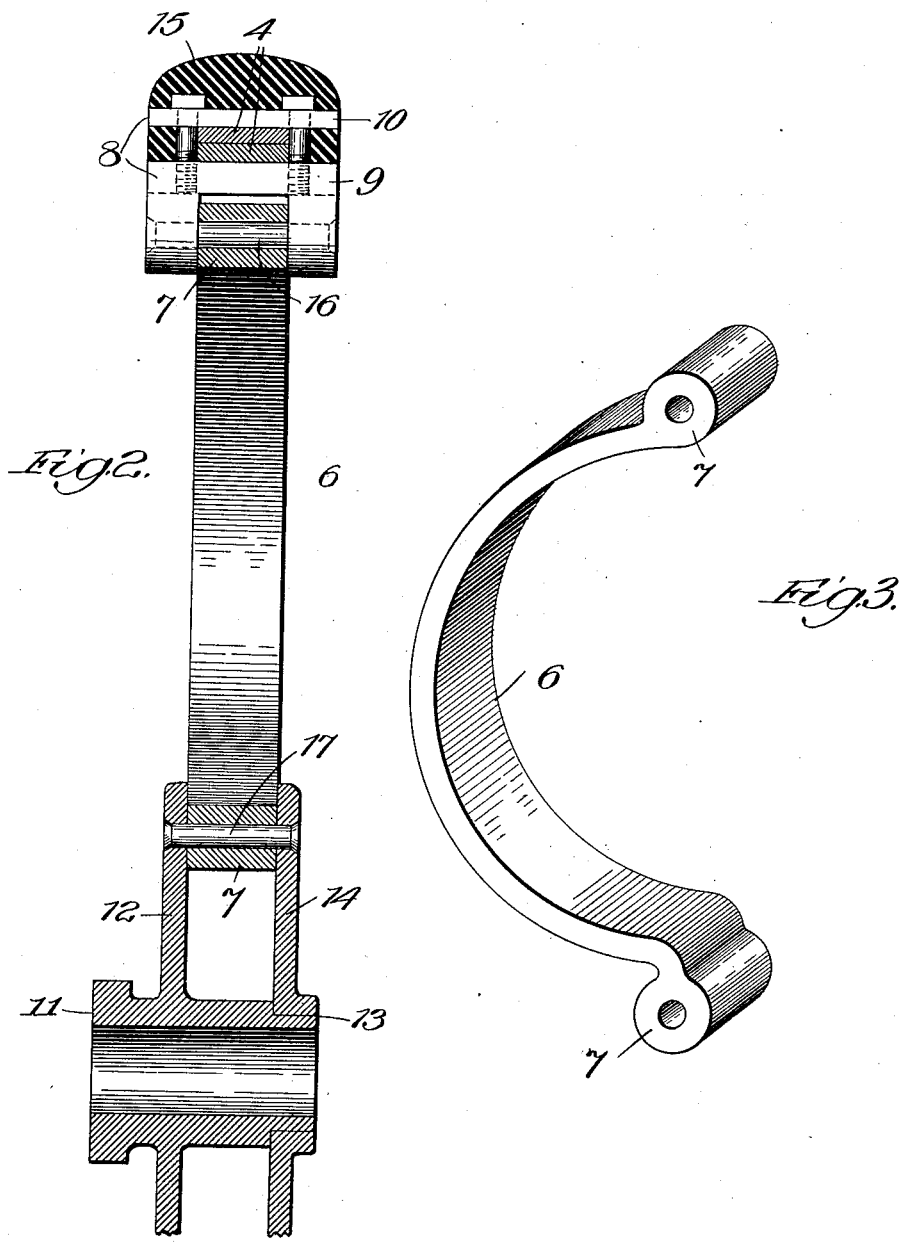

UNITED STATES PATENT OFFICE.

WILLIAM H. FAHRNEY, OF CHICAGO, ILLINOIS.

SPRING VEHICLE-WHEEL.

1,098,028.

Specification of Letters Patent.

Patented May 26, 1914.

Application filed May 22, 1913. Serial No. 769,187.

*To all whom it may concern:*

Be it known that I, WILLIAM H. FAHRNEY, a citizen of the United States, residing at Chicago, in the county of Cook and State of Illinois, have invented a new and useful Improvement in Spring Vehicle-Wheels, of which the following is a specification.

My invention relates to an improvement in the class of spring vehicle-wheels in which an annular spring-band, or tire, is connected with the hub by a circumferential series of interposed springs.

The object of my invention is to provide a construction of wheel in the class referred to, whereby the spring-connection of the flexible annular band with the hub shall be such as to cause the band to exert its resilient action in a manner to shorten the radius only in the direction from the ground toward the axis of rotation, and thus prevent the formation of two centers of rotation, which would, of course, render the wheel inoperative.

In the accompanying drawing, Figure 1 shows a spring vehicle-wheel embodying my invention by a broken view in side elvation, with the action of the springs and annular rim, in passing over an obstruction indicated by dotted representation; Fig. 2 is a broken section of the same on line 2, Fig. 1, and Fig. 3 shows one of the connecting springs in the curved form in which it is preferably provided and from which it is stretched in adjusting it in place in the wheel.

The wheel illustrated comprises an annular spring-band 4, shown to be formed of two concentric band-springs, a wheel-center 5, and a circumferential series of curved flat springs 6 pivotally connecting the center 5 radially with the band 4.

The normal curve of each spring 6, as shown in Fig. 3, is that of a semi-circle between end-eyes 7, the spring being bent into that form and then tempered. The spring in that form is too short to extend to its opposite points of attachment without stretching it to reach those points; and the stretching tensions the spring for the purpose hereinafter explained. The band-spring is provided with a circumferential series of clips 8, equidistant apart, the preferred construction of which is that shown of a U-shaped member 9 and a strap-member 10 bolted thereto to clamp the annular spring 6 between the two members. The center 5 comprises a hub 11 having a disk 12 formed about it near one end and an offset at 13 about its opposite end on which fits a companion-disk 14. The band-spring is shown to be embedded in a solid rubber tire 15.

To assemble the parts, each spring 6 is fastened to a clip by inserting it at one of its eyes 7 between the arms of the member 9 and passing through the arms and eye a pivot-pin 16, the ends of which may be riveted to secure the pin; and the spring is partially unbent to extend its opposite eye into position to be pivoted between the two disks 12 and 14 by a pin 17, the ends of which may be riveted, as shown.

The tensioning of all the springs, by the partial unbending to which each is subjected in setting it into place, is uniform, or substantially uniform, so that in the unloaded condition of the wheel, each spring 6 exerts centripetally the same tension on the band-spring 4, which is then circular. When the wheel is loaded, however, the weight of the load is distributed over the springs 6 which are above the horizontal diameter.

The action may best be explained through the medium of an example: The annular band spring may be assumed to flex to the extent of about one-eighth of an inch under a load of 1000 lbs. on the hub; and the tension of each spoke-spring may be assumed to be 400 lbs. The load is suspended by the springs 6 in the upper diameter of the wheel, which are marked $a$ to $g$, inclusive, on Fig. 1, and the proportion of the load carried by each spring at $a$ and $g$ may be denoted by $400+A$, that carried by each spring at $b$ and $f$ by $400+B$, that carried by each spring $c$ and $e$ may be denoted $400+C$, and that by the spring $d$ may be denoted by $400+D$, all as represented on said figure. "D" being less than 400, the radii of the upper diameter of the wheel remain constant and lower radii vary for the reason that the stress upon each of the upper springs 6 exceeds, by its proportion of the sustained load, the stress on each of the springs in the lower diameter of the wheel. In other words, each lower spring 6 exerts a stress of pulling the circumference 4 toward the hub greater in pounds to the extent of the proportion of the load supported by any spoke-spring when it reaches a position where the direction of its stress coincides with the vertical diameter of the annular band-spring; for "400" is greater than "D."

In order to allow the annular band-spring to flex, as in passing over an obstruction represented at 18 in Fig. 1, its radius must, as indicated by the dotted lines in Fig. 1, lengthen at the points where its ellipticity begins; and since the radii vary only in the lower diameter of the wheel, the upper diameter remains concentric with the hub. Thus the resiliency of the wheel is exerted, without changing its axis of rotation, by the lower half of the band-spring, by shortening the radius of the latter only in the direction from the ground to the axis.

I realize that considerable variation is possible in the details of construction thus specifically shown and described, and I do not intend by illustrating a single specific or preferred embodiment of my invention to be limited thereto; my intention being in the following claims to claim protection for all the novelty there may be in my invention as broadly as the state of the art will permit.

What I claim as new and desire to secure by Letters Patent is:—

1. A spring vehicle-wheel comprising an annular band-spring having a predetermined resistance to flexure under a given load, a wheel-center, and connecting springs each normally shorter than the distance separating the band-spring and center in its central position therein and through which it is stretched a predetermined extent to connect the band-spring and center so as to exert a predetermined degree of strain to pull the band-spring toward said center, throughout the extent of depression of the band-spring in exerting its resilient action, with a force in excess of the force of that portion of the weight of the load supported by any spoke when it coincides with the upper vertical radius of the wheel in the rotation of the latter.

2. A spring vehicle-wheel comprising an annular band-spring having a predetermined resistance to flexure under a given load, and provided at intervals with clips, a wheel-center formed of a hub and a pair of disks surrounding it, and spoke-forming flat springs having eyes on their ends and tempered in approximately semicircular form, each spoke being normally shorter than the distance separating a clip from a point in radial line therewith on the disks and stretched for connecting said clip and disks at pins between the latter so as to exert a predetermined degree of strain to pull the band-spring toward said center, throughout the extent of depression of the band-spring in exerting its resilient action, with a force in excess of the force of that portion of the weight of the load supported by any spoke when it coincides with the upper vertical radius of the wheel in the rotation of the latter.

WILLIAM H. FAHRNEY.

In presence of—
L. Heislar,
E. D. Stule.

---

Copies of this patent may be obtained for five cents each, by addressing the "Commissioner of Patents, Washington, D. C."